(12) United States Patent
Takahashi et al.

(10) Patent No.: US 12,177,699 B2
(45) Date of Patent: Dec. 24, 2024

(54) TERMINAL AND COMMUNICATION NODE

(71) Applicant: NTT DOCOMO, INC., Tokyo (JP)

(72) Inventors: Hideaki Takahashi, Tokyo (JP);
Tianyang Min, Tokyo (JP); Kenji Kai, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 334 days.

(21) Appl. No.: 17/630,439

(22) PCT Filed: Jul. 31, 2019

(86) PCT No.: PCT/JP2019/030039
§ 371 (c)(1),
(2) Date: Jan. 26, 2022

(87) PCT Pub. No.: WO2021/019735
PCT Pub. Date: Feb. 4, 2021

(65) Prior Publication Data
US 2022/0286879 A1   Sep. 8, 2022

(51) Int. Cl.
*H04W 64/00* (2009.01)
*H04W 24/08* (2009.01)
*H04W 24/10* (2009.01)
*H04W 76/15* (2018.01)

(52) U.S. Cl.
CPC ........... *H04W 24/08* (2013.01); *H04W 24/10* (2013.01); *H04W 64/003* (2013.01); *H04W 76/15* (2018.02)

(58) Field of Classification Search
CPC ..... H04W 24/10; H04W 24/08; H04W 76/18; H04W 64/003; H04W 76/15
See application file for complete search history.

(56) References Cited

U.S. PATENT DOCUMENTS

| 2016/0007403 | A1  | 1/2016  | Futaki et al. |
| 2016/0277987 | A1* | 9/2016  | Chen ................. H04L 5/0085 |
| 2018/0098258 | A1* | 4/2018  | Annam ............... H04B 17/318 |
| 2020/0260518 | A1* | 8/2020  | Orsino ................ H04W 76/38 |
| 2021/0234601 | A1* | 7/2021  | Awadin .............. H04L 5/0048 |
| 2021/0368403 | A1* | 11/2021 | Wu .................... H04W 76/30 |
| 2021/0385897 | A1* | 12/2021 | Purkayastha ....... H04W 36/305 |

(Continued)

FOREIGN PATENT DOCUMENTS

WO    2014/132560 A1    9/2014

OTHER PUBLICATIONS

Office Action issued in Chinese Application No. 201980098547.0, dated Jun. 26, 2023 (23 pages).

(Continued)

*Primary Examiner* — Chi Ho A Lee
(74) *Attorney, Agent, or Firm* — Osha Bergman Watanabe & Burton LLP

(57) ABSTRACT

A terminal that communicates simultaneously with a first communication node and a second communication node includes a detection unit that detects a failure in communication with the second communication node; and a transmitting unit that transmits notification including failure information and positional information to the first communication node, the failure information concerning a failure in communication with the second communication node and the positional information being obtained at the time when the failure was detected. In another aspect a communication node is also disclosed.

10 Claims, 7 Drawing Sheets

(56) References Cited

U.S. PATENT DOCUMENTS

2022/0183055 A1* 6/2022 Rune .................. H04W 74/006
2022/0361275 A1* 11/2022 Da Silva ............... H04W 76/18

OTHER PUBLICATIONS

International Search Report issued in PCT/JP2019/030039 on Jan. 28, 2020 (2 pages).
Written Opinion of the International Searching Authority issued in PCT/JP2019/030039 on Jan. 28, 2020 (4 pages).
Ericsson; "Fast MCG recovery in MR-DC"; 3GPP Tsg-Ran WG2#105, R2-1901413; Athens, Greece; Feb. 25-Mar. 1, 2019 (3 pages).
Motorola; "Obtaining Location Information for Immediate MDT reporting"; 3GPP TSG-RAN WG2#70bis, R2-103916; Stockholm, Sweden; Jun. 28-Jul. 2, 2010 (2 pages).
Nokia, Nokia Shanghai Bell; "Correction of PDU session split at handover"; 3GPP TSG-RAN WG2#105, R2-1902760; Athens, Greece; Feb. 25-Mar. 1, 2019 (2 pages).
Ericsson; "Enhancements to radio link failure report as part of MDT"; 3GPP TSG-RAN WG2#105bis, Tdoc R2-1904014; Xi'an, China; Apr. 8-12, 2019 (6 pages).
3GPP TS 32.422 V15.2.0; "3rd Generation Partnership Project; Technical Specification Group Services and System Aspects; Telecommunication management; Subscriber and equipment trace; Trace control and configuration management (Release 15)"; Jun. 2019 (189 pages).
Office Action issued in counterpart Japanese Patent Application No. 2021-536550 mailed on Jan. 24, 2023 (6 pages).
OPPO; "Fast MCG recovery for MR-DC enhancement"; 3GPP TSG-RAN2 #105bis, R2-1903088; Xian, China; Apr. 8-12, 2019 (3 pages).
CATT; "Discussion on fast recovery procedure"; 3GPP TSG-RAN WG3 #103, R3-190286; Athens, Greece; Feb. 25-Mar. 1, 2019 (3 pages).
Huawei; "Overview of RAN3 impacts for DC and CA enhancement"; 3GPP TSG-RAN3 Meeting #103, R3-190532; Athens, Greece; Feb. 25-Mar. 1, 2019 (3 pages).
Office Action issued in Chinese Application No. 201980098547.0, dated Nov. 30, 2023 (16 pages).
Office Action issued in Chinese Application No. 201980098547.0, dated May 27, 2024 (10 pages).

* cited by examiner

FIG. 5

MCGFailureInformation message

```
-- ASN1START
-- TAG-MCGFAILUREINFORMATION-START

MCGFailureInformation-r16 ::=       SEQUENCE {
    criticalExtensions                  CHOICE {
        mcgFailureInformation-r16           MCGFailureInformation-r16-IEs,
        criticalExtensionsFuture            SEQUENCE {}
    }
}

MCGFailureInformation-r16-IEs ::=   SEQUENCE {
    failureReportMCG-r16                FailureReportMCG-r16                OPTIONAL,
    nonCriticalExtension                SEQUENCE {}                         OPTIONAL
}

FailureReportMCG-r16 ::=            SEQUENCE {
    failureType-r16                     ENUMERATED {
                                            t310-Expiry, randomAccessProblem,
                                            rlc-MaxNumRetx, spare2, spare1},
    measResultFreqList-r16              MeasResultFreqList                                          OPTIONAL,
    measResultSCG-Failure-r16           OCTET STRING (CONTAINING MeasResultMCG-Failure)             OPTIONAL,
    locationInfo-r16                    LocationInfo-r16                                            OPTIONAL,
    ...
}

MeasResultFreqList ::=              SEQUENCE (SIZE (1..maxFreq)) OF MeasResult2NR

-- TAG-MCGFAILUREINFORMATION-STOP
-- ASN1STOP
```

| MCGFailureInformation field descriptions |
|---|
| *locationInfo*<br>The field contains available location at the UE upon MCG failure in NR. |
| *measResultFreqList*<br>The field contains available results of measurements on NR frequencies the UE is configured to measure by *measConfig*. |
| *measResultMCG-Failure*<br>The field contains the *MeasResultMCG-Failure* IE which includes available results of measurements on NR frequencies the UE is configured to measure by the NR MCG *RRCReconfiguration* message. |

FIG. 6

LocationInfo information element

```
-- ASN1START

LocationInfo-r16 ::=              SEQUENCE {
    locationCoordinates-r16           CHOICE {
        ellipsoid-Point-r16               OCTET STRING,
        ellipsoidPointWithAltitude-r16    OCTET STRING,
        ...,
        ellipsoidPointWithUncertaintyCircle-r11          OCTET STRING,
        ellipsoidPointWithUncertaintyEllipse-r11         OCTET STRING,
        ellipsoidPointWithAltitudeAndUncertaintyEllipsoid-r11  OCTET STRING,
        ellipsoidArc-r11                                 OCTET STRING,
        polygon-r11                                      OCTET STRING
    },
    horizontalVelocity-r16            OCTET STRING                  OPTIONAL,
    gnss-TOD-msec-r16                 OCTET STRING                  OPTIONAL,
    verticalVelocityInfo-r15          CHOICE {
        verticalVelocity-r15              OCTET STRING,
        verticalVelocityAndUncertainty-r15  OCTET STRING
    }         OPTIONAL
}
-- ASN1STOP
```

| LocationInfo field descriptions |
| --- |
| *ellipsoidArc*<br>Parameter *EllipsoidArc* defined in TS 36.355 [54]. The first/leftmost bit of the first octet contains the most significant bit. |
| *ellipsoid-Point*<br>Parameter *Ellipsoid-Point* defined in TS 36.355 [54]. The first/leftmost bit of the first octet contains the most significant bit. |
| *ellipsoidPointWithAltitude*<br>Parameter *EllipsoidPointWithAltitude* defined in TS 36.355 [54]. The first/leftmost bit of the first octet contains the most significant bit. |
| *ellipsoidPointWithAltitudeAndUncertaintyEllipsoid*<br>Parameter *EllipsoidPointWithAltitudeAndUncertaintyEllipsoid* defined in TS 36.355 [54].The first/leftmost bit of the first octet contains the most significant bit. |
| *ellipsoidPointWithUncertaintyCircle*<br>Parameter *Ellipsoid-PointWithUncertaintyCircle* defined in TS 36.355 [54]. The first/leftmost bit of the first octet contains the most significant bit. |
| *ellipsoidPointWithUncertaintyEllipse*<br>Parameter *EllipsoidPointWithUncertaintyEllipse* defined in TS 36.355 [54]. The first/leftmost bit of the first octet contains the most significant bit. |
| *gnss-TOD-msec*<br>Parameter *Gnss-TOD-msec* defined in TS 36.355 [54]. The first/leftmost bit of the first octet contains the most significant bit. |
| *horizontalVelocity*<br>Parameter *HorizontalVelocity* defined in TS 36.355 [54]. The first/leftmost bit of the first octet contains the most significant bit. |
| *polygon*<br>Parameter *Polygon* defined in TS 36.355 [54]. The first/leftmost bit of the first octet contains the most significant bit. |
| *verticalVelocityAndUncertainty*<br>Parameter *verticalVelocityAndUncertainty* corresponds to *horizontalWithVerticalVelocityAndUncertainty* defined in TS 36.355 [54]. The first/leftmost bit of the first octet contains the most significant bit. |
| *verticalVelocity*<br>Parameter *verticalVelocity* corresponds to *horizontalWithVerticalVelocity* defined in TS 36.355 [54]. The first/leftmost bit of the first octet contains the most significant bit. |

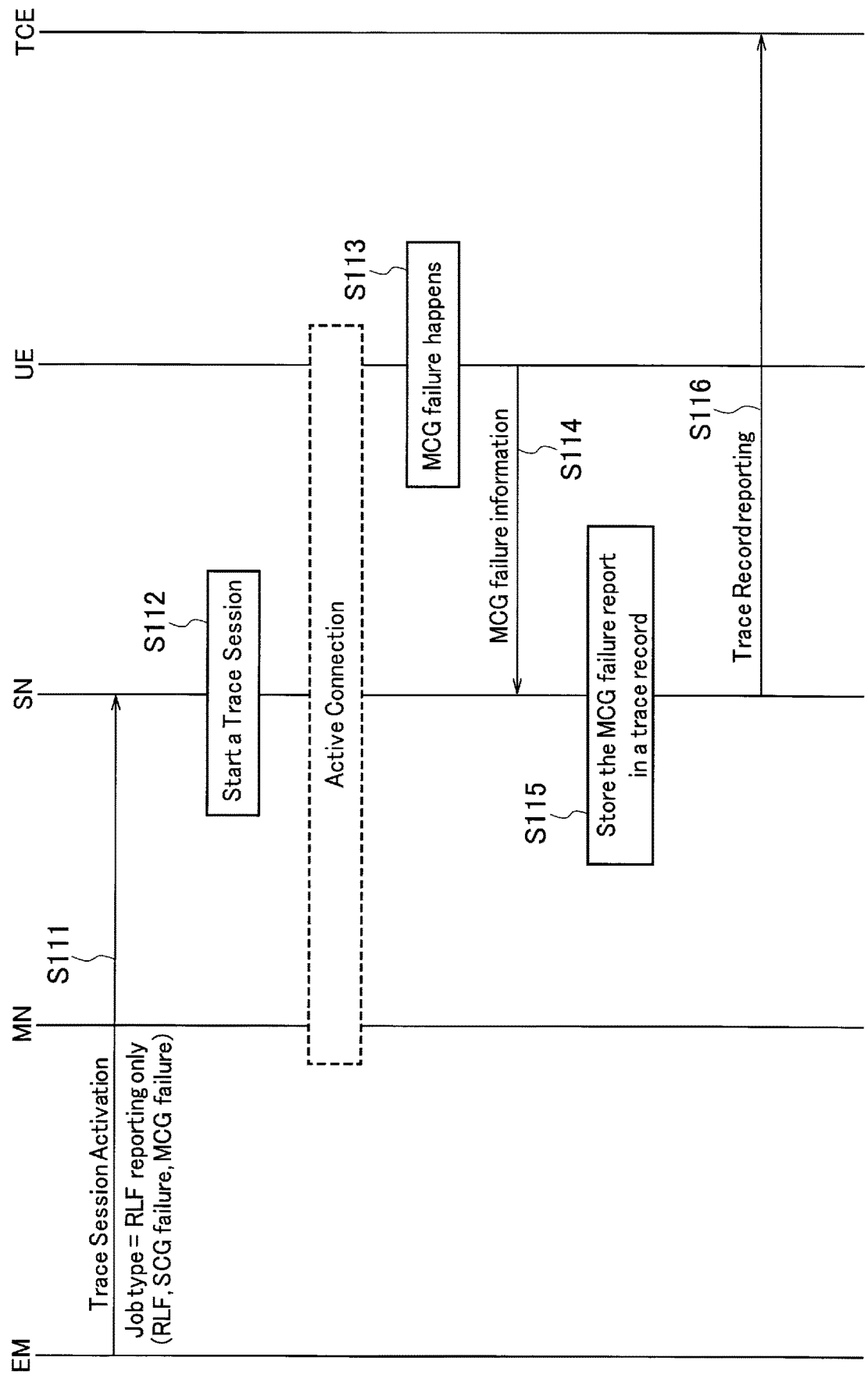

TERMINAL AND COMMUNICATION NODE

TECHNICAL FIELD

The present invention relates to terminals and communication nodes that perform a trace for RLF reporting.

BACKGROUND ART

The 3rd Generation Partnership Project (3GPP) has developed the specifications for Long Term Evolution (LTE) and also for LTE-Advanced (hereinafter, LTE-Advanced is included in LTE) for the purpose of achieving a higher speed than LTE, and it is further developing specifications for a 5th generation mobile communication system (which is also called 5G, New Radio (NR), or Next Generation (NG)).

LTE has employed Minimization of Drive Test (MDT) for collecting radio quality and positioning information from terminals as a substitute of driving tests. MDT specifies Trace for RLF reporting, according to which a terminal reports a radio link failure (RLF) when it is detected (see Non-patent document 1).

When a base station receives Trace Session Activation in which RLF reporting only is specified in the Job type from a management apparatus (element manager: EM), it starts a trace for the RLF reporting.

When a terminal the connection between which and the base station is active detects an RLF, the terminal performs a Radio Resource Control (RRC) reconnection procedure. When the terminal completes the RRC reconnection, it transmits an RRC Connection Reestablishment Complete message indicating that the terminal has an RLF report.

The RLF report is transmitted from the terminal to the base station through UE Information Request/Response communicated between the base station and the terminal.

The base station stores the RLF report in a trace record and transmits the trace record to a trace collection entity (TCE).

PRIOR ART DOCUMENT

Non-Patent Document

Non-patent document 1: TS32.422 V15.2.0 3rd Generation Partnership Project; Technical Specification Group Services and System Aspects; Telecommunication management; Subscriber and equipment trace; Trace control and configuration management (Release 15), 3GPP, 2019-06

SUMMARY OF THE INVENTION

NR specifies dual connectivity (DC) for a terminal to communicate multiple communication nodes simultaneously.

Unfortunately, a conventional trace for RLF reporting is not based on the DC configuration specified in NR.

The present invention has been made in light of the above situation, and an objective thereof is to provide a method of performing a trace for RLF reporting that is suitable for the DC configuration with which a terminal communicates with multiple communication nodes simultaneously.

A terminal (200) according to an aspect of the present invention includes: a communication unit (210, 220) that communicates simultaneously with a first communication node (100b, SN) and a second communication node (100a, MN); a detection unit (230) that detects a failure in communication with the second communication node (100a, MN); and a transmitting unit (220) that transmits failure information and positional information to the first communication node (100b, SN), the failure information concerning a failure in communication with the second communication node (100a, MN) and the positional information being obtained at the time when the failure was detected.

A communication node (100b, SN) according to an aspect of the present invention includes: a communication unit (110, 120) that, together with a second communication node (100a, MN), communicates with a terminal (200); a control unit (130) that performs a trace to collect failure information from the terminal (200); a receiving unit (110) that receives failure information and positional information from the terminal (200), the failure information concerning a failure in communication with the second communication node (100a, MN) and the positional information being obtained at the time when the failure was detected; and a transmitting unit (120) that transmits the failure information and the positional information to a trace collection entity (400) when the communication node (100b, SN) is performing a trace.

BRIEF DESCRIPTION OF THE DRAWINGS

FIG. 5 is a diagram illustrating an example of information of which a piece of UE notifies an SN.

FIG. 6 is a diagram illustrating an example of positional information on the position of a terminal included in the information shown in FIG. 5.

FIG. 7 is a sequence diagram illustrating the procedure for the case where an SN performs a trace for an MCG failure.

MODE FOR CARRYING OUT THE INVENTION

Figure 1:
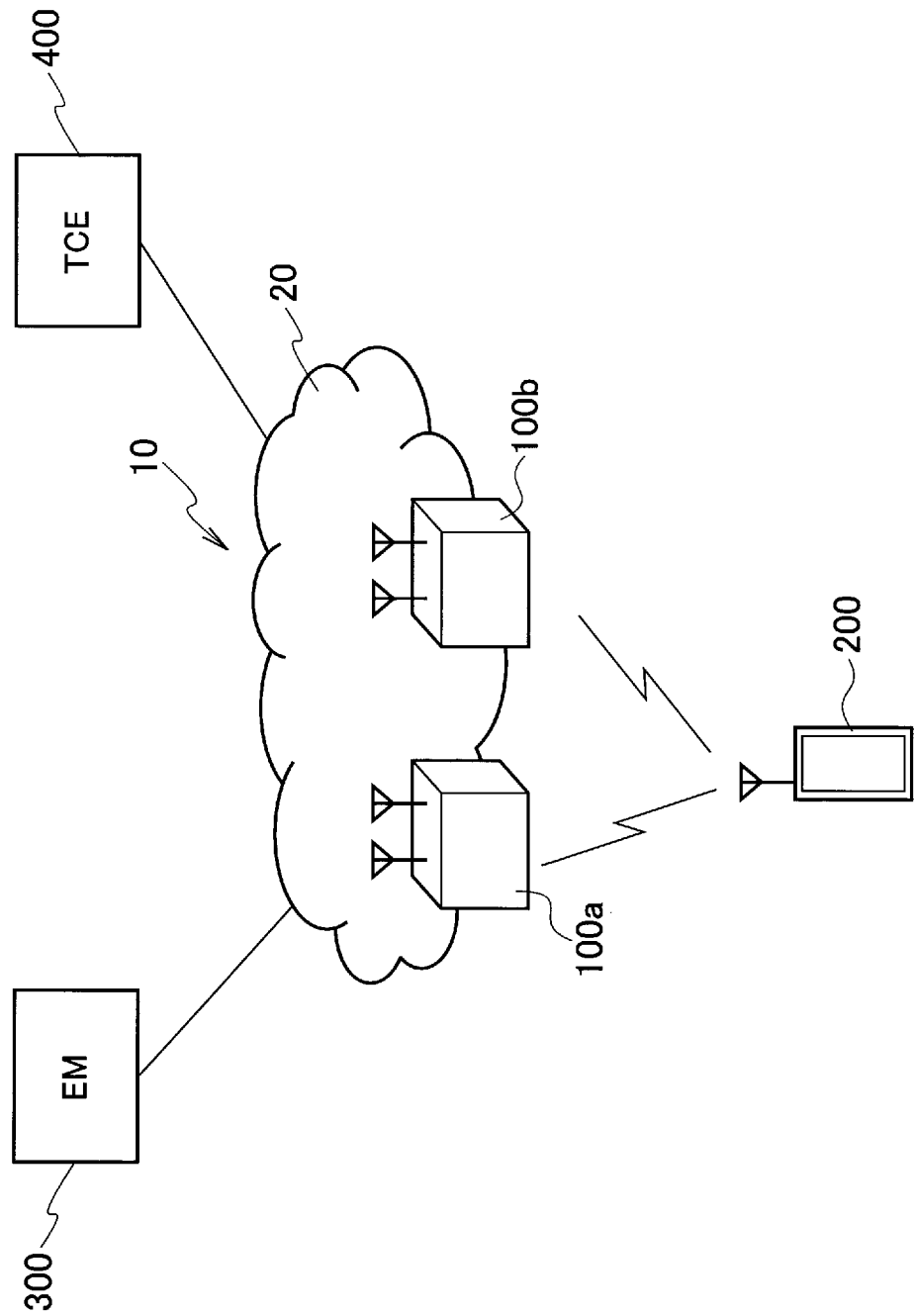
FIG. 1 is an overall schematic configuration diagram of a radio communication system.

The following describes an embodiment based on the drawings. Note that the same functions and configurations are denoted by the same or similar reference numerals, and description thereof is omitted as appropriate.

(1) Overall Schematic Configuration of Radio Communication System

As illustrated in FIG. 1, a radio communication system includes a next generation-radio access network 20 (hereinafter referred to as an NG-RAN 20) and a terminal 200. The terminal is also called user equipment (UE).

The NG-RAN 20 includes communication nodes 100a and 100b. The concrete configuration of the radio communication system 10 including the number of the communication nodes and terminals is not limited to the example illustrated in FIG. 1.

The NG-RAN 20 actually includes multiple NG-RAN Nodes, specifically, gNBs (or ng-eNBs), and is connected to a 5G core network (5GC) conforming to NR. FIG. 1 illustrates an EM 300 and a TCE 400 included in the core network. Note that the NG-RAN 20 and 5GC may be simply expressed as a "network".

The communication nodes 100a and 100b are gNBs or ng-eNBs. The communication nodes 100a and 100b perform radio communication conforming to NR with the terminal 200.

The communication nodes 100a and 100b and the terminal 200 are capable of supporting massive MIMO for generating more directional beams by controlling the radio signals transmitted from multiple antenna elements, carrier aggregation (CA) for using multiple component carriers (CC), dual connectivity (DC) for simultaneous communication between multiple NG-RAN Nodes and a terminal, and the like.

The radio communication system 10 may include an evolved universal terrestrial radio access network (E-UTRAN) instead of the NG-RAN 20. In this case, the E-UTRAN includes multiple E-UTRAN Nodes, specifically, eNBs (or en-gNBs), and is connected to a core network (EPC) conforming to LTE. In this case, the communication nodes 100a and 100b are eNBs or en-gNBs.

In NR, serving cells are classified as follows. Note that the serving cell means a cell a radio link between which and a terminal has been established.

A group of serving cells associated with a communication node (master node, MN) that provides a control plane connected to the core network is called a master cell group (MCG). The MCG includes a primary cell (hereinafter, a PCell) and one or more secondary cells (hereinafter, SCells). The PCell is used when a terminal starts an initial connection with the MN. The MCG may be constituted of only a PCell. The PCell is also called a special cell (SpCell) in the MCG.

A group of serving cells associated with a communication node (secondary node, SN) that does not provide a control plane connected to the core network but provides additional resources to terminals is called a secondary cell group (SCG). The SCG includes a primary SCell (hereinafter, PSCell) and one or more SCells. The PSCell is used when a terminal starts an initial connection with the SN. The SCG may be constituted of only a PSCell. The PSCell is also called an SpCell in the SCG.

In the present embodiment, the communication node 100a is assumed to be an MN. The communication node 100a forms a PCell. The communication node 100b is assumed to be an SN. The communication node 100b forms a PSCell. Here, the communication node 100a may be an SN, and the communication node 100b may be an MN.

The communication nodes 100a and 100b start a trace for RLF reporting based on an instruction from the EM 300. Specifically, when the communication nodes 100a and 100b receive Trace Session Activation indicating RLF reporting only from the EM 300, they start a trace session. In Trace Session Activation, RLF reporting only is written in the Job type. SCG failure and MCG failure may be included under RLF in the Job type. For example, RLF reporting only (RLF, SCG failure, MCG failure) is written in the Job type. The Trace Session Activation may include the IP address of the TCE 400.

When the terminal 200, the connection between which and the communication nodes 100a and 100b is active, detects an abnormality in the MCG or SCG, the terminal 200 transmits information on the detected abnormality to the communication nodes 100a and 100b.

The communication nodes 100a and 100b, which are performing the trace, store the information received from the terminal 200 in a trace record and transmits the trace record to the TCE 400.

(2) Functional Block Configuration of Radio Communication System

Next, the configurations of the communication nodes 100a and 100b and the terminal 200 according to the present embodiment will be described. The following describes only parts related to the features of the present embodiment. Hence, the communication nodes 100a and 100b and the terminal 200 naturally include other functional blocks not related to the features of the present embodiment.

Figure 2:
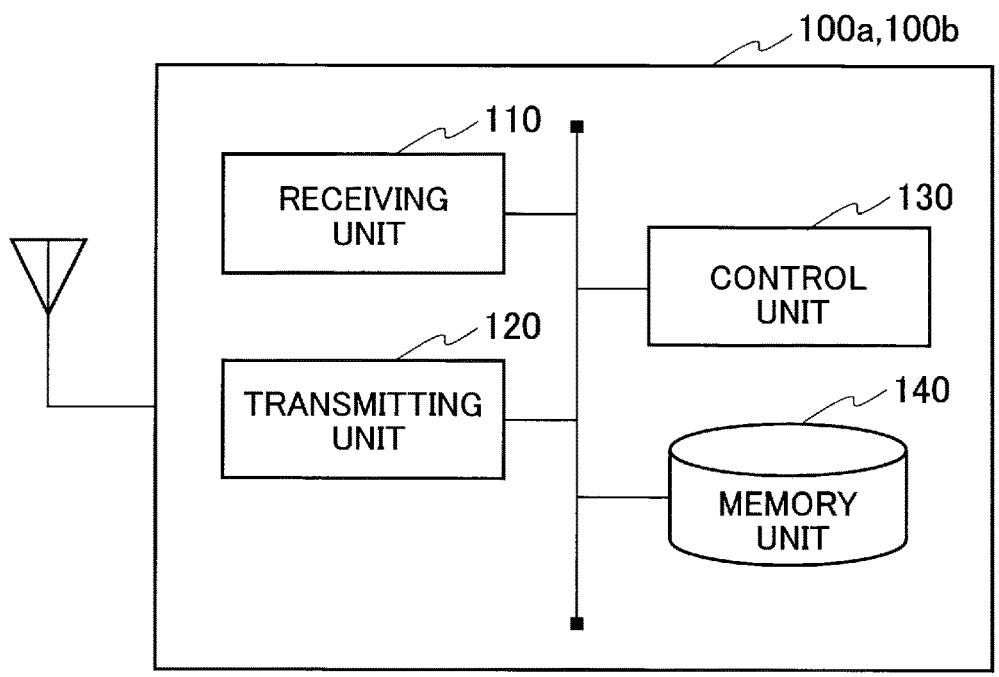
FIG. 2 is a functional block configuration diagram of a communication node.

The configuration of the communication node 100b serving as an SN will be described with reference to FIG. 2. The communication node 100a and the communication node 100b have the same configuration, and hence, description of the communication node 100a is omitted. The communication node 100b illustrated in FIG. 2 includes a receiving unit 110, a transmitting unit 120, a control unit 130, and a memory unit 140.

In dual connectivity, the receiving unit 110, together with the communication node 100a, receives uplink data from the terminal 200. The transmitting unit 120, together with the communication node 100a, transmits downlink data to the terminal 200. The receiving unit 110 and the transmitting unit 120 constitute a communication unit that, together with the communication node 100a, communicates with the terminal 200.

The receiving unit 110 receives an instruction to start a trace for RLF reporting, from the EM 300.

The receiving unit 110 receives information on a failure detected by the terminal 200. Information on a failure is, for example, an MCG failure. The receiving unit 110 may receive information on a failure from the terminal 200 and also may receive information on a failure from the other communication node 100a.

When the communication node 100b is performing a trace, the transmitting unit 120 transmits a trace record including information on a failure detected by the terminal 200 to the TCE 400.

When the other communication node 100a is performing a trace, the transmitting unit 120 transmits information on a failure received from the terminal 200 to the other communication node 100a.

The control unit 130 starts a trace when the receiving unit 110 receives an instruction to start a trace.

The control unit 130 stores information on a failure received by the receiving unit 110 into a trace record. The information on a failure stored in a trace record may be called an RLF report, SCG failure report, or MCG failure report. The control unit 130 makes the transmitting unit 120 transmit the trace record at a specified time.

The memory unit 140 stores trace records.

Figure 3:
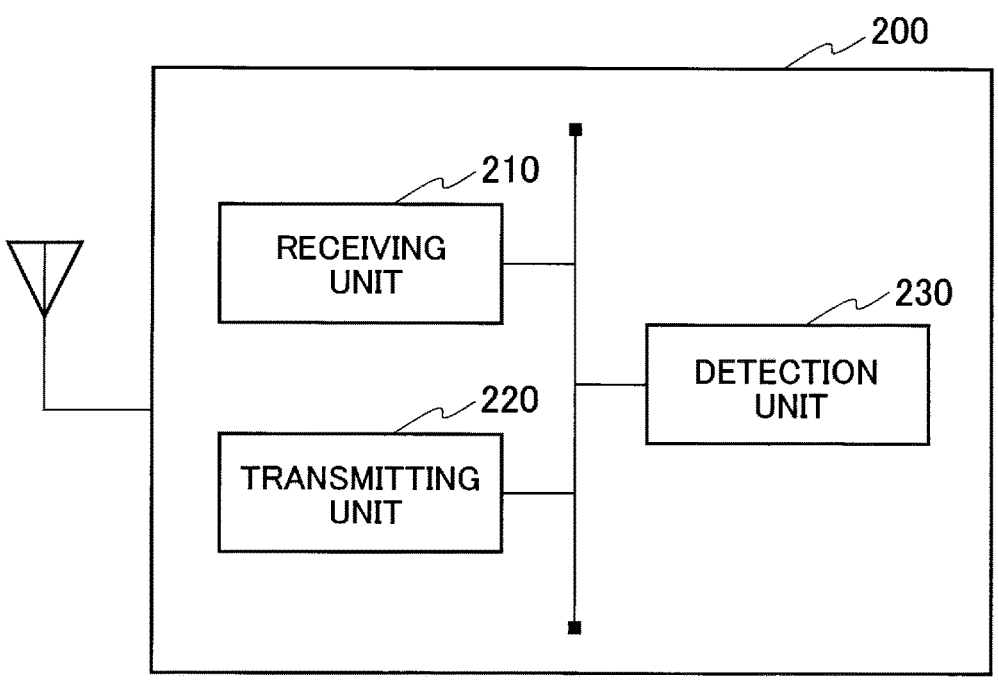
FIG. 3 is a functional block configuration diagram of a terminal.

The configuration of the terminal 200 will be described with reference to FIG. 3. The terminal 200 illustrated in FIG. 3 includes a receiving unit 210, a transmitting unit 220, and a detection unit 230.

In dual connectivity, the receiving unit 210 receives downlink data from each of the communication nodes 100a and 100b. The transmitting unit 220 transmits uplink data to each of the communication nodes 100a and 100b. The receiving unit 210 and the transmitting unit 220 constitute a communication unit that communicates each of the communication nodes 100a and 100b simultaneously.

When the detection unit 230 detects a failure, the transmitting unit 220 notifies the communication nodes 100a and 100b of information on the detected failure. At this time, the transmitting unit 220 reports the information on the detected failure to a communication node of the communication nodes 100a and 100b that is not involved in the detected failure. For example, when a failure is detected in communication between the terminal 200 and the communication node 100a, the transmitting unit 220 notifies the communication node 100b that a failure has been detected in communication with the communication node 100a. When a failure is detected in communication between the terminal 200 and the communication node 100b, the transmitting unit 220 notifies the communication node 100a that a failure has been detected in communication with the communication node 100b.

The detection unit 230 is configured to detect a failure in communication with each of the communication nodes 100a and 100b. In other words, the detection unit 230 separately detects a failure in each of the MCG and the SCG.

The detection unit 230 may judge that an MCG failure has happened when one of the following events happened in the MCG: when a timer T310 that started after a notification of a radio communication problem from the physical layer is over, when a random access procedure failed, or when it was detected that the number of retransmissions exceeded its maximum number in the radio link control (RLC).

The detection unit 230 may judge that an SCG failure has happened when one of the following events happened in the SCG: when the timer T310 that started after a notification of a radio communication problem from the physical layer is over, when a random access procedure failed, when it was detected that the number of retransmissions exceeded its maximum number in the radio link control (RLC), when an SCG reconfiguration with sync failed, when an SCG reconfiguration failed, or when an integrity check failure in SRB3 was notified from an SCG lower layer.

(3) Operation of Radio Communication System

The following describes the operation of the radio communication system 10 for the case an MCG failure happened. Here, the communication node 100a is referred to as MN, the communication node 100b as SN, and the terminal 200 as UE. The following describes two cases: a case where an MCG failure happens when the MN is performing a trace, and a case where an MCG failure happens when the SN is performing a trace. In either case, the UE are communicating with both the MN and the SN simultaneously.

(3-1) A Case Where MCG Failure Happens When MN is Performing Trace

Figure 4:
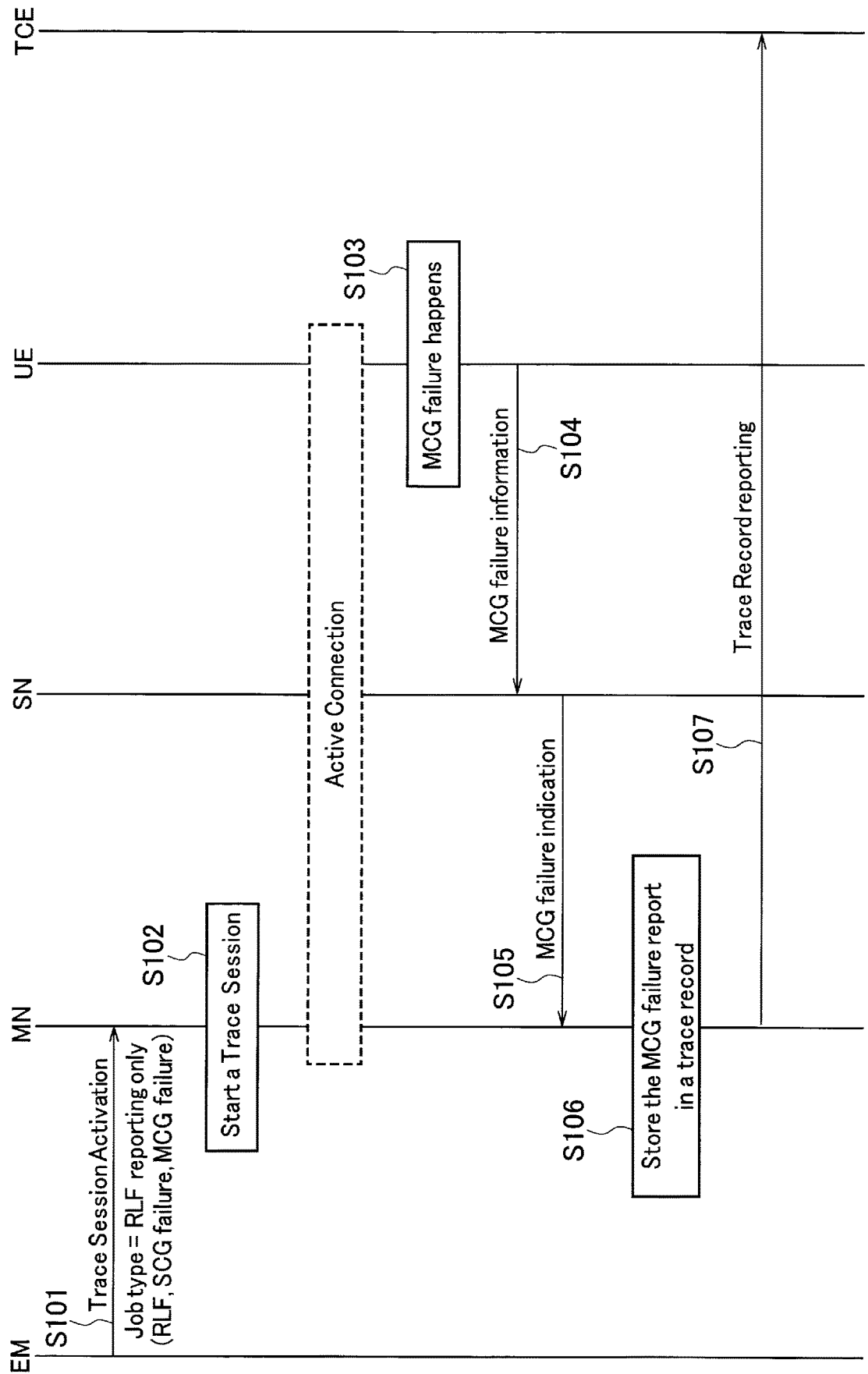
FIG. 4 is a sequence diagram illustrating the procedure for the case an MN performs a trace for an MCG failure.

The operation of the radio communication system 10 will be described with reference to FIG. 4 for a case where an MCG failure happens when the MN is performing a trace.

At step S101, the EM transmits Trace Session Activation to the MN.

At step S102, the MN starts a trace for RLF reporting.

At step S103, the UE, the connection between which and the MN and the SN is active, detects an MCG failure.

At step S104, the UE transmits the MCG failure information to the SN. For example, the UE may transmit MCGFailureInformation as illustrated in FIG. 5 to the SN via SRB3. The SRB3 is a bearer for control messages between the terminal 200 and the SN.

The UE may include information related to the MCG failure in the MCGFailureInformation. For example, in the case where the timer T310 is over, the UE sets t310-Expiry in the failureType. In the case where the UE has detected a random-access procedure failure in the MAC layer of the MCG, the UE sets randomAccessProblem in the failure-Type. In the case where the UE has detected that the number of retransmissions exceeded its maximum number in the RLC layer of the MCG, the UE sets rlc-MaxNumRetx in the failureType.

The UE may include radio quality for each MeasObject set in the MCG, in the MCGFailureInformation. The MeasObject is information for setting the radio access technology (RAT) and frequency to be measured.

The UE may include, in the MCGFailureInformation, positional information indicating the position of the UE itself at the time when the UE detected an MCG failure such as the positional information obtained by using a global navigation satellite system (GNSS) or failedPCellID. For example, the UE may include LocationInfo illustrated in FIG. 6 in the MCGFailureInformation.

Alternatively, the UE may notify the SN of the positional information on the position of the UE itself at the time when the UE detected an MCG failure, in response to an inquiry from the SN.

Note that after MGC failure detection, the UE may perform the process in step S104 before performing an RRC reconnection procedure for connection with the MN or may perform the process in step S104 after completing the RRC reconnection procedure for connection with the MN.

At step S105, the SN notifies the MN of the occurrence of the MCG failure. For example, the SN may transmit a CG-Config message including the MCG failure information to the MN. The MN and the SN are communicably connected with an X2 interface.

At step S106, the MN stores the MCG failure report in a trace record.

At step S107, the MN transmits the trace record to the TCE.

(3-2) A Case Where MCG Failure Happens When SN is Performing Trace

The operation of the radio communication system 10 will be described with reference to FIG. 7 for a case where an MCG failure happens when the SN is performing a trace.

At step S111, the EM transmits Trace Session Activation to the SN.

At step S112, the SN starts a trace for RLF reporting.

At step S113, the UE, the connection between which and the MN and the SN is active, detects an MCG failure.

At step S114, the UE transmits the MCG failure information to the SN. The method of notifying the SN of the MCG failure information is the same as or a similar to the process at step S104 in (3-1).

At step S115, the SN stores the MCG failure report in a trace record.

At step S116, the SN transmits the trace record to the TCE.

(4) Operations and Advantageous Effects

The terminal 200 in the foregoing embodiment, which communicates with both the MN and the SN simultaneously, detects a failure in the MCG and transmits the MCG failure information to the SN when an MCG failure is detected.

With the above configuration of the terminal 200, information on a failure in the MCG detected by the terminal 200 is transmitted to the SN, and hence, the radio link does not need to be reconnected in the MCG to transmit the MCG failure information to the SN. Thus, the foregoing embodiment can provide a method of performing a trace for RLF reporting, suitable for a DC configuration.

When the SN in the foregoing embodiment receives MCG failure information from the terminal 200, if the MN is performing a trace, the SN transmits the MCG failure information to the MN.

Since with the above configuration of the SN, the MCG failure information is transmitted to the MN that is performing a trace, the terminal 200 only needs to report the MCG failure information to the SN which is not involved in the failure.

Since the MCG failure information in the foregoing embodiment includes the positional information on the position of the terminal 200 at the time when the terminal 200 detected the failure, the core network can obtain the positional information at the time of the occurrence of the MCG failure, and thus, the core network can geographically identify the area having a problem in area quality.

(5) Other Embodiments

Although the present invention has been described as above based on the embodiment, the present invention is not limited to these descriptions, but it is apparent to those skilled in the art that various modifications and improvements are possible.

The block configuration diagrams (FIGS. 2 and 3) used to describe the foregoing embodiment show blocks in units of functions. These functional blocks (components) are implemented with a combination of pieces of either hardware or software or both. The method of implementing each functional block is not limited to any specific ones. Specifically, each functional block may be implemented by using one apparatus into which the constituents are physically or logically combined or by using two or more apparatuses that are physically or logically separated but directly or indirectly connected to one another (for example, using wires, radio communication, or the like). The functional blocks may be implemented by using a combination of the above one or multiple apparatuses and software.

The functions include judging, deciding, determining, calculating, computing, processing, deriving, investigating, searching, checking, receiving, transmitting, outputting, accessing, resolving, choosing, selecting, establishing, comparing, supposing, expecting, assuming, broadcasting, notifying, communicating, forwarding, configuring, reconfiguring, allocating or mapping, and assigning, but the functions are not limited to theses. For example, a functional block (component) that has a function of transmission is called a transmitting unit or a transmitter. In either case, the implementation method is not limited to any specific ones, as mentioned above.

Figure 8:
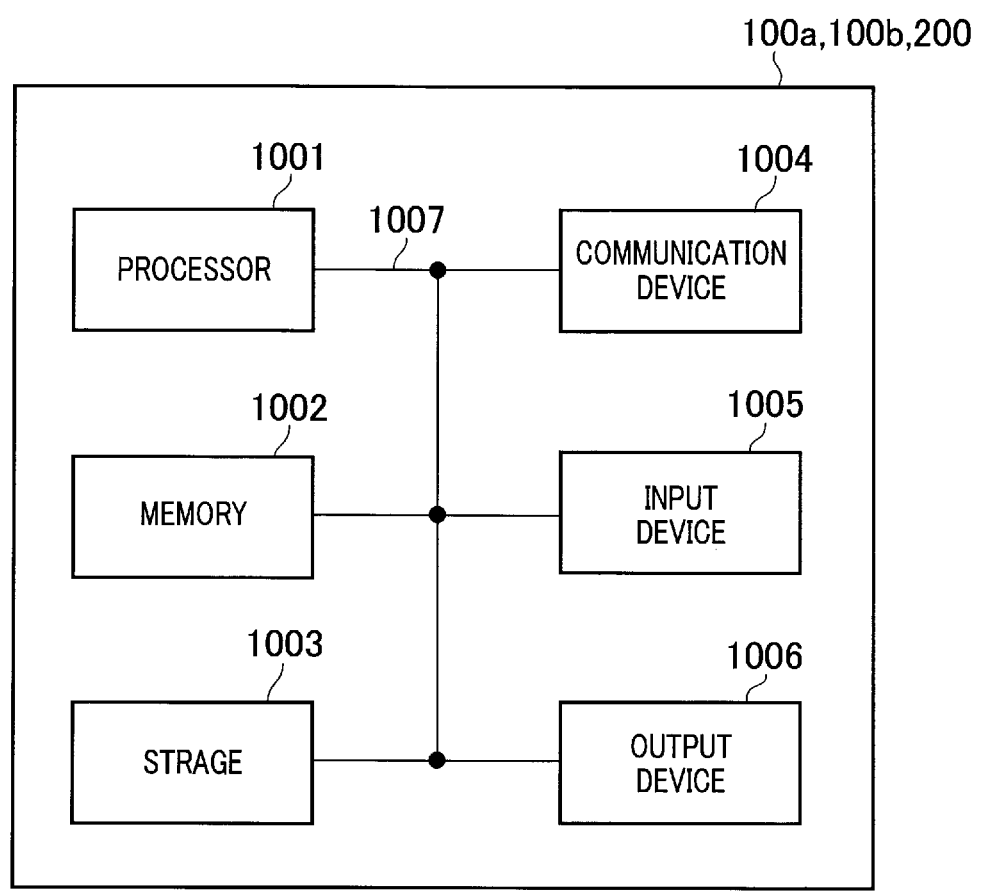
FIG. 8 is a diagram illustrating an example of the hardware configuration of a communication node and a terminal.

In addition, the foregoing communication nodes 100a and 100b and the terminal 200 may function as a computer that performs processes in the radio communication method of the present disclosure. FIG. 8 is a diagram illustrating an example of the hardware configuration of the communication node and the terminal. As illustrated in FIG. 11, the communication node and the terminal may be configured as a computer apparatus including a processor 1001, memory 1002, storage 1003, communication apparatus 1004, input apparatus 1005, output apparatus 1006, bus 1007, and others.

Note that in the following description, the wording "apparatus" may be interpreted as a circuit, device, unit, or the like. The hardware configuration of the apparatus may include one or more apparatuses illustrated in the figure or may be a configuration without some of the apparatuses.

Each functional block of the apparatus is implemented by using a hardware component of the computer apparatus or a combination of some of the hardware components.

Each function of the apparatus is implemented by loading specified software (program) into hardware such as the processor 1001 or the memory 1002. The processor 1001 performs computing according to the software to control the communication performed by the communication apparatus 1004 and control either reading or writing or both reading and writing of data in the memory 1002 and storage 1003.

The processor 1001, for example, runs an operating system to control the entire computer. The processor 1001 may be constituted of a central processing unit (CPU) including an interface with peripheral apparatuses, a control apparatus, a computation apparatus, and a register.

The processor 1001 loads a program (program codes), software modules, data, and the like from at least one of the storage 1003 and the communication apparatus 1004 into the memory 1002, and performs various processes according to these. The program used here is a program that causes a computer to perform at least part of the operation described in the foregoing embodiment. The foregoing various processes may be performed by one processor 1001 or may be performed by two or more processors 1001 simultaneously or sequentially. The processor 1001 may be constituted of one or more chips. Note that the program may be transmitted from a network via an electrical communication line.

The memory 1002 is a computer readable recording medium and may be constituted of, for example, at least one of media including read only memory (ROM), erasable programmable ROM (EPROM) electrically erasable programmable ROM (EEPROM), and random access memory (RAM). The memory 1002 may be called a register, a cache, main memory (a main storage apparatus), or the like. The memory 1002 can store a program (program codes), software modules, or the like with which the method according to an embodiment of the present disclosure can be performed.

The storage 1003 is a computer readable recording medium and may be constituted of, for example, at least one of media including an optical disk such as Compact Disc ROM (CD-ROM), a hard disk drive, a flexible disk, a magneto-optical disk (for example, a Compact Disc, a Digital Versatile Disc, a Blu-Ray® Disc), a smart card, flash memory (for example, a card, a stick, or a key drive), a Floppy® disk, and a magnetic strip. The storage 1003 may be called an auxiliary storage apparatus. The foregoing recording medium may be, for example, a database, a server, or other suitable media including at least one of the memory 1002 and the storage 1003.

The communication apparatus 1004 is hardware (a transmission/reception device) for performing communication between computers via at least one of a wired network and a radio network. The communication apparatus 1004 is called, for example, a network device, network controller, network card, communication module, or the like.

The communication apparatus 1004 may include, for example, a high-frequency switch, duplexer, filter, frequency synthesizer, and the like to implement at least one of techniques: frequency division duplex (FDD) and time division duplex (TDD).

The input apparatus 1005 is an input device for receiving input from the outside (for example, a keyboard, mouth, microphone, switch, button, sensor, and the like). The output apparatus 1006 is an output device for performing output to the outside (for example, a display, speaker, LED lamp, or the like). Note that the input apparatus 1005 and the output apparatus 1006 may be integrally formed as one unitary structure (for example, a touch panel).

The apparatuses such as the processor 1001, the memory 1002, and others are connected to one another via the bus 1007 for communicating information. The bus 1007 may be constituted of one type of bus or may be constituted to have a different bus for each apparatus.

Further, the apparatus may include hardware such as a microprocessor, a digital signal processor (DSP), an application specific integrated circuit (ASIC), a programmable logic device (PLD), a field programmable gate array (FPGA), and the like, and some or all of the functional blocks may be implemented by the hardware. The processor 1001 may be implemented, for example, by using at least one of these pieces of hardware.

Notification of information is not limited to an aspect/embodiment described in the present disclosure, but other methods may be used for it. For example, notification of information may be performed by physical layer signaling (for example, downlink control information (DCI), uplink control information (UCI)), upper layer signaling (for example, radio resource control (RRC) signaling, medium access control (MAC) signaling, broadcasting information (a master information block (MIB), a system information block (SIB)), or other signaling, or using a combination of these. RRC signaling may be called an RRC message and may be, for example, an RRC Connection Setup message, an RRC Connection Reconfiguration message, or the like.

Each aspect/embodiment described in the present disclosure may be applied to at least one of a system using LTE, LTE-A, SUPER 3G, IMT-Advanced, the 4th generation mobile communication system (4G), 5G future radio access (FRA), NR, W-CDMA®, GSM®, CDMA2000, Ultra Mobile Broadband (UMB), IEEE 802.11 (Wi-Fi®), IEEE 802.16 (WiMAX®), IEEE 802.20, ultra-wideband (UWB), Bluetooth®, or another suitable system; and a next generation system extended based on these systems. Each aspect/embodiment may be applied to a combination of multiple systems (for example, a combination of 5G and at least one of LTE and LTE-A, or the like).

For the procedure, sequence, flowcharts, and the like of each aspect/embodiment described in the present disclosure, the order may be changed as far as it does not cause inconsistency. For example, in the method described in the present disclosure, the elements in the various steps have been presented in an exemplary order, and the present disclosure is not limited to the presented specific order.

Certain operations that have been assumed to be performed by a base station in the present disclosure are performed by the upper node in some cases. It is apparent that various operations performed, to communicate with terminals, in a network constituted of one or more network nodes having a base station can be performed by at least one of the base station and other network nodes other than the base station (for example, MME, S-GW, and the like are conceivable, but the present disclosure is not limited to these). Although the above description is for an example in which the number of network nodes other than the base station is one, multiple other network nodes may be combined (for example, MME and S-GW).

Information and signals (information and the like) can be outputted from an upper layer (or a lower layer) to a lower layer (or an upper layer). Information and the like may be inputted and outputted via multiple network nodes.

Inputted or outputted information and the like may be stored in a specific location (for example, memory) or may be managed by using a management table. Information and the like that are inputted and outputted may be overwritten or updated, or other information may be added to it. Outputted information and the like maybe deleted. Inputted information and the like may be transmitted to other apparatuses.

Determination may be performed by using a value expressed in one bit (0 or 1), by using a Boolean value (true or false), or by comparison of numerical values (for example, comparison with a specified value).

Each aspect/embodiment described in the present disclosure may be used alone, may be combined and used, or may be switched during the execution. In addition, notification of specified information (for example, notification that something is X) is not limited to that performed explicitly but may be performed implicitly (for example, by not performing notification of the specified information).

It should be broadly understood that software, whether it is called software, firmware, middleware, microcode, a hardware description language, or other names, means instructions, instruction sets, codes, code segments, program codes, programs, subprograms, software modules, applications, software applications, software packages, routines, subroutines, objects, executable files, execution threads, procedures, or functions.

Software, instructions, information, and the like maybe communicated via a transmission medium. For example, in the case where software is transmitted from a website, a server, or other remote sources through at least one of a wired technology (coaxial cable, optical fiber cable, twisted pair cable, digital subscriber line (DSL), or the like) and a wireless technology (infrared rays, microwaves, or the like), the at least one of these wired technology and wireless technology is included within the definition of a transmission medium.

Information, signals, or the like described in the present disclosure may be expressed by using one of various different technologies. For example, data, instructions, commands, information, signals, bits, symbols, chips, and the like that can be referred to in the above entire description may be expressed by using voltage, electric current, electromagnetic waves, magnetic fields or magnetic particles, light fields or photons, or combinations of any of these.

Note that the terms explained in the present disclosure and the terms necessary to understand the present disclosure maybe replaced with terms having the same or similar meanings. For example, at least one of channel and symbol may be signal (signaling). A signal may be a message. A component carrier maybe called a carrier frequency, cell, frequency carrier, or the like.

The terms "system" and "network" used in the present disclosure are used interchangeably.

The information, parameters, and the like described in the present disclosure may be expressed by using absolute values, relative values to specified values, or other associated information. For example, a radio resource may be indicated by an index.

The names used for the foregoing parameters are not restrictive in any respect. Further, equations or the like using these parameters may be different from the ones disclosed explicitly in the present disclosure. Various channels (for example, PUCCH, PDCCH, and the like) and information elements can be identified by various suitable names, and hence, various names assigned to these various channels and information elements are not restrictive in any respect.

The terms in the present disclosure such as "base station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", and "component carrier" can be used interchangeably. A base station may also be called a macro cell, small cell, femto-cell, pico-cell, or the like.

A base station can accommodate one or more (for example, three) cells. In the case where a base station accommodates multiple cells, the overall coverage area of the base station can be divided into multiple smaller areas, and a communication service for each smaller area may be provided by a base station subsystem (for example, a small indoor base station (remote radio head: RRH).

The term "cell" or "sector" refers to part or all of the coverage area of at least one of a base station and a base station subsystem that provides a communication service in this coverage.

In the present disclosure, terms such as "mobile station" "user terminal", "user equipment", and "terminal" can be used interchangeably.

A mobile station may be called, by those skilled in the art, a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of a base station and a mobile station may be called a transmission apparatus, reception apparatus, communication apparatus, or the like. Note that at least one of a base station and a mobile station may be a device mounted on a mobile object, a mobile object itself, or the like. The mobile object may be transportation (for example, a car, an airplane, or the like), an uncrewed mobile object (for example, a drone, an automated driving vehicle, or the like), or a robot (crewed or uncrewed). Note that at least one of a base station and a mobile station includes an apparatus that does not necessarily move while performing communication. For example, at least one of a base station and a mobile station may be an Internet of things (IoT) unit such as a sensor.

A communication node in the present disclosure may be interpreted as a terminal. Each aspect/embodiment in the present disclosure may be applied to, for example, a configuration in which communication between a communication node and a terminal is replaced with communication between multiple terminals (which may be called, for example, device-to-device (D2D), vehicle-to-everything (V2X), or the like). In this case, a terminal may have functions that a foregoing communication node has. Wording such as "uplink" and "downlink" may be interpreted as wording corresponding to communication between terminals (for example, "side"). For example, an uplink channel, a downlink channel, and the like may be interpreted as a side channel.

Similarly, a terminal in the present disclosure may be interpreted as a communication node. In this case, a communication node may have functions that the foregoing terminal has.

The terms "connected" and "combined" or any variation of these mean various types of direct or indirect connection or combination between two or more elements and hence include cases in which one or more intermediate elements are present between two elements connected or combined to each other. Combination or connection between elements maybe a physical one, a logical one, or a combination of these. For example, "connection" may be interpreted as "access". When these terms are used in the present disclosure, it can be considered that two elements are "connected" or "combined" to each other by using at least one of connections such as one or more electric wires, cables, and printed electrical connections or by using, as some non-limiting and non-exhaustive examples, electromagnetic energy having wavelengths in a radio frequency region, a microwave region, or an optical (both visible and invisible) region, or the like.

The description "based on" used in the present disclosure does not mean "based only on" unless specifically stated otherwise. In other words, the description "based on" means both "based only on" and "based at least on".

Any reference to elements using designations such as "first", "second", and the like in the present disclosure does not generally limit the quantity or order of those elements. These designations can be used in the present disclosure as a convenient method for distinguishing between two or more elements. Hence, reference to the first and the second elements does not mean that only two elements can be employed or that the first element has to precede the second element in a respect.

In the case where articles, for example, "a", "an", and "the" in English, are added in translation in the present disclosure, the nouns following these articles may include plural forms in the present disclosure.

Although the present disclosure has been described in detail as above, it is apparent to those skilled in the art that the present disclosure is not limited to the embodiment described in the present disclosure. The present disclosure can be implemented as modified or changed embodiments without departing from the sprit and scope of the present disclosure defined by the claims. The purpose of describing the present disclosure is to illustrate examples, and hence the description does not have any intension to limit the present disclosure.

EXPLANATION OF THE REFERENCE NUMERALS

10 radio communication system
20 network
100*a*, 100*b* communication node
110 receiving unit
120 transmitting unit
130 control unit
140 memory unit
200 terminal
210 receiving unit
220 transmitting unit
230 detection unit
300 EM
400 TCE
1001 processor
1002 memory
1003 storage
1004 communication apparatus
1005 input apparatus
1006 output apparatus
1007 bus

The invention claimed is:
1. A terminal comprising:
a communication unit that communicates with a first communication node and a second communication node by using dual connectivity;
a detection unit that detects a failure in communication with the second communication node; and a transmitting unit that transmits failure information including positional information to the first communication node via a bearer for control messages between the first communication node and the terminal, the failure information concerning a failure in communication with the second communication node and the positional information being obtained at the time when the failure was detected and including a failure type, wherein the positional information indicates a position of the terminal at a time when the terminal detects the failure, and wherein when a timer T310 expires, the detection unit detects the failure and sets the failure type to t310-Expiry.

2. The terminal according to claim 1, wherein the first communication node does not provide a control plane connected to a core network, and the second communication node provides a control plane connected to a core network.

3. A communication node comprising:
a communication unit that, together with a second communication node, communicates with a terminal;
a control unit that performs a trace to collect failure information from the terminal;
a receiving unit that receives failure information and positional information from the terminal, the failure information concerning a failure in communication with the second communication node and the positional information being obtained at the time when the failure was detected and including a failure type; and
a transmitting unit that transmits the failure information and the positional information to a trace collection entity when the communication node is performing the trace,
wherein the positional information indicates a position of the terminal at a time when the terminal detects the failure, and
wherein when a timer T310 expires, the terminal detects the failure and sets the failure type to t310-Expiry.

4. The communication node according to claim 3, wherein in a case where the second communication node is performing the trace, the transmitting unit transmits the failure information and the positional information to the second communication node.

5. The communication node according to claim 3, wherein the communication node does not provide a control plane connected to a core network, and the second communication node provides a control plane connected to a core network.

6. The communication node according to claim 4, wherein the communication node does not provide a control plane connected to a core network, and the second communication node provides a control plane connected to a core network.

7. The terminal according to claim 1, wherein the failure information is transmitted from the first communication node to the second communication node.

8. The terminal according to claim 1, wherein the first communication node functions as a secondary node, and the second communication node functions as a master node.

9. A radio communication system comprising:
a terminal, a first communication node, and a second communication node, wherein
the terminal includes:
a communication unit that communicates with a first communication node and a second communication node by using dual connectivity;
a detection unit that detects a failure in communication with the second communication node; and
a transmitting unit that transmits failure information including positional information to the first communication node via a bearer for control messages between the first communication node and the terminal, the failure information concerning a failure in communication with the second communication node and the positional information being obtained at the time when the failure was detected and including a failure type,
the first communication node includes:
a communication unit that communicates with the terminal by using dual connectivity; and
a receiving unit that receives the failure information from the terminal, and
the second communication node includes a communication unit that communicates with the terminal by using dual connectivity,
wherein the positional information indicates a position of the terminal at a time when the terminal detects the failure, and
wherein when a timer T310 expires, the detection unit detects the failure and sets the failure type to t310-Expiry.

10. A radio communication method comprising:
communicating with a first communication node and a second communication node by using dual connectivity;
detecting a failure in communication with the second communication node; and
transmitting failure information including positional information to the first communication node via a bearer for control messages between the first communication node and the terminal, the failure information concerning a failure in communication with the second communication node and the positional information being obtained at the time when the failure was detected and including a failure type,
wherein the positional information indicates a position of the terminal at a time when the terminal detects the failure, and
wherein when a timer T310 expires, detecting the failure and setting the failure type to t310-Expiry.

* * * * *